United States Patent
Givens

(10) Patent No.: US 8,215,258 B2
(45) Date of Patent: Jul. 10, 2012

(54) ALARMED CHUCK WRENCH

(75) Inventor: Charles Givens, Millington, TN (US)

(73) Assignee: Charles R. Givens, Millington, TN (US)

( * ) Notice: Subject to any disclaimer, the term of this patent is extended or adjusted under 35 U.S.C. 154(b) by 884 days.

(21) Appl. No.: 12/275,916

(22) Filed: Nov. 21, 2008

(65) Prior Publication Data

US 2010/0126317 A1      May 27, 2010

(51) Int. Cl.
    *H01H 9/28*      (2006.01)
(52) U.S. Cl. .......................... 116/200; 81/479
(58) Field of Classification Search .................. 116/200; 200/43.01, 318, 43.08; 81/467, 124.7, 479; 7/138

See application file for complete search history.

(56) References Cited

U.S. PATENT DOCUMENTS

| | | | |
|---|---|---|---|
| 2,541,196 A | 2/1951 | Brague | |
| 2,588,565 A | 3/1952 | Pealer | |
| 2,598,119 A * | 5/1952 | Goff | 81/436 |
| 2,618,995 A | 11/1952 | Droege | |
| 2,690,690 A * | 10/1954 | Garton | 81/16 |
| 2,826,950 A | 3/1958 | McClintock | |
| 3,673,895 A | 7/1972 | Des Jardins | |
| 3,761,654 A | 9/1973 | Davis | |
| 3,869,943 A | 3/1975 | Buck | |
| 3,876,369 A * | 4/1975 | Behrens | 81/475 |
| 3,950,625 A | 4/1976 | Klebe, Jr. et al. | |
| 3,967,513 A * | 7/1976 | Myrdal | 81/477 |
| 4,133,543 A | 1/1979 | Johnson | |
| 4,145,102 A | 3/1979 | Felter | |
| 4,306,628 A * | 12/1981 | Adams et al. | 175/4.56 |
| 4,314,490 A * | 2/1982 | Stone | 81/479 |
| 4,426,642 A * | 1/1984 | Poffenbarger | 340/690 |
| 4,512,221 A * | 4/1985 | Picone | 81/170 |
| 4,543,723 A * | 10/1985 | Bortfeld et al. | 30/381 |
| 4,669,319 A | 6/1987 | Heyraud | |
| D322,740 S | 12/1991 | McCart | |
| 5,237,136 A * | 8/1993 | Langston | 200/81 R |
| 5,251,706 A * | 10/1993 | Evans | 173/29 |
| 6,289,770 B1 * | 9/2001 | Collins | 81/57.39 |
| 6,477,921 B1 * | 11/2002 | Picone | 81/170 |
| 6,844,819 B2 * | 1/2005 | Luebke et al. | 340/660 |

(Continued)

OTHER PUBLICATIONS

Derwent Abstract 2008-E03714, Abstract of CN 101104207 A, published Jan. 16, 2008, "Lathe starting up preventing device, has current on-off controller ie.e photo-switch, installed on chuck wrench bearing frame, where contact of on-off controller is serially connect to bus wire of electric control circuit".*

(Continued)

*Primary Examiner* — R. A. Smith
*Assistant Examiner* — Tania Courson
(74) *Attorney, Agent, or Firm* — Kenneth Solomon

(57) ABSTRACT

A novel safety-equipped chuck wrench is provided, as well as a method for using the same. The safety-equipped chuck wrench comprises a chuck wrench and a safety device associated with the chuck wrench, where the safety device comprises an alarm, a power source and an alarm activation switch. The alarm activation switch causes the alarm to activate so long as the chuck wrench is engaged in a chuck, subject to de-activation by engagement of a cut-off switch, if any. The alarm may be an audible alarm, a visual alarm, or both. The safety-equipped chuck wrench may include a mechanism for temporarily disabling the alarm, preferably through the use of a cutoff switch.

25 Claims, 4 Drawing Sheets

U.S. PATENT DOCUMENTS

| | | | | |
|---|---|---|---|---|
| 7,041,938 | B2 * | 5/2006 | Kumada et al. | 219/270 |
| 7,335,840 | B2 | 2/2008 | Young et al. | |
| 7,439,871 | B2 * | 10/2008 | Hsieh | 340/665 |
| 7,954,557 | B2 * | 6/2011 | Cutler et al. | 173/1 |
| 2002/0096019 | A1 * | 7/2002 | Murray | 81/16 |
| 2009/0260491 | A1 * | 10/2009 | Rainone et al. | 81/479 |

OTHER PUBLICATIONS

Derwent Abstract 2009-R36046, Abstract of CN 201338246, published Nov. 4, 2009, "Safety chuck wrench, has spring is equipped outside fine neck, rceiver matched with electric signal emitter and including normally-closed contact connected with control loop of control switch of machine tool".*

Derwent Abstract 2010-A42755, Abstract of CN 201371252, published Dec. 30, 2009, "Safety seat for machine tool chuck wrench, has circuit formed by travel switch, light seat and machine tool main motor contol box, which is closed circuit when uppern end of switch is pressed downward, so as to operate machine tool".*

Derwent Abstract 2011-L65254, Abstract of CN 201040930, published Aug. 24, 2011, "Multi-purpose safety wrench for lathe worker, has spring arranged above gasket, chuck wrench connected with bracket in spring, and locating pin passing through locating sleeve connected with bracket".*

Unknown, Wikipedia, Chuck (engineering), Sep. 8, 2008, pp. 1-5.

Rockford Systems, Inc. web pages, Jun. 27, 2008, pp. 1-4.

Longer Lathe Chuck Wrenches, Catalog LCW, Rockford Systems, Inc.

Lathe Chuck Wrenches, Omron Scientific Technologies, Inc., Machine Services Division, p. N7.

Flexbar, Lathe Chuck Safety Wrenches, web pages Jan. 29, 2009, pp. 1-2.

* cited by examiner

ALARMED CHUCK WRENCH

BACKGROUND OF THE INVENTION

1. Field of the Invention

The present invention involves a chuck wrench with a safety device incorporated therewith, and further may include a bypass button that permits the safety device to be temporarily deactivated during use.

2. Description of the Related Art

Chuck wrenches are well known as keys for adjusting the chuck on a machine tool, among other things. Chuck wrenches of various shapes and sizes exist, from the small key used to change a hand held electric drill to a large, heavy wrench to tighten and loosen the chuck on a massive machine tool. A chuck wrench for a machine tool can weigh a pound or more and typically comprises a high content of metal.

The chuck, when the machine tool is turned on, can accelerate to speeds of two thousand revolutions per minute from a dead rest relatively quickly. In the event a machine tool operator, either through neglect, inexperience or otherwise, fails to remove a chuck wrench prior to activating the machine tool, the chuck wrench can become a hazardous, high-speed projectile once the machine tool is turned on. This, quite obviously, is an undesirable and unsafe working environment, and others have sought to prevent this occupational danger through various means.

U.S. Pat. No. 2,588,565 (the '565 patent) describes a safety lock incorporated onto a machine tool that prevents the controlling switch from being activated until a chuck wrench is placed in the lock. This is disadvantageous for multiple reasons. An existing machine tool would have to be retrofitted with this particular safety lock, which can be expensive if even practical. This safety lock may also not be compatible with more than one type of chuck wrench. Alternatively, a negligent operator who views the safety device as an annoyance may simply keep a spare chuck wrench or some other item of sufficient weight in the lock to intentionally bypass the safety lock and thereby eliminate its efficacy.

Somewhat similar to the '565 Patent, U.S. Pat. No. 7,335,840 (the '840 patent) describes a safety apparatus incorporated onto a machine tool, where the apparatus includes an actuator switch connected to the circuits of the machine tool such that, when the chuck wrench is placed in the apparatus, the machine tool cannot be activated. The '840 patent has the same disadvantages as those of the '565 patent, except that the safety apparatus of the '840 patent further requires electrical work to be performed in order to retrofit an existing machine.

U.S. Pat. No. 3,673,895 (the '895 patent) discloses a chuck wrench that includes a spring to create a self-ejecting mechanism. This spring forces the chuck wrench away from the machine tool chuck, such that, when the operator has completed using the chuck wrench, in the event the operator leaves the chuck wrench in the machine tool, the force of the spring would push the chuck wrench out of the chuck. This type of chuck wrench also has significant disadvantages. The operator is not only required to exert torque force on the chuck wrench while turning it to tighten the chuck, but also must exert downward force on the chuck wrench, in the direction of the chuck, to counteract the opposing forces created by the spring. Alternatively, the operator may readily remove or otherwise disable the spring so as to intentionally bypass the safety mechanism and thereby eliminate its efficacy.

Rather similar to the '895 patent, U.S. Pat. No. 3,869,943 (the '943 patent) also discloses a chuck wrench with a self-ejecting spring, having the same disadvantages as the '895 patent.

U.S. Pat. No. 2,618,995 (the '995 patent) discloses a chuck wrench with an internal spring, where the spring does not push the chuck wrench as a whole away from the machine tool chuck, but instead retracts a portion of the wrench that engages the chuck back into the wrench. This type of chuck wrench also has significant disadvantages, similar to those of the '895 and '943 patents.

SUMMARY OF THE INVENTION

The present invention is, therefore, directed to a novel safety-equipped chuck wrench. The safety-equipped chuck wrench comprises a chuck wrench and a safety device associated with the chuck wrench, where the safety device comprises an alarm, a power source and an alarm activation switch. The alarm activation switch causes the alarm to activate so long as the chuck wrench is engaged in a chuck, subject to de-activation by engagement of a cut-off switch, if any. The alarm may be an audible alarm, a visual alarm, or both. An embodiment of the present invention includes a mechanism for temporarily disabling the alarm, preferably through the use of a cutoff switch.

The present invention is further directed to a novel method of using such a chuck wrench. The method comprises engaging the bit of the chuck wrench in a chuck, applying torque force to the handle of the chuck wrench, resulting in tightening or loosening the chuck, and releasing the handle of the safety-equipped chuck wrench while leaving the bit engaged in the chuck, wherein such release results in activation of the alarm.

DETAILED DESCRIPTION OF THE INVENTION

The present invention relates to a safety-equipped chuck wrench. The safety-equipped chuck wrench comprises a chuck wrench and a safety device associated with the chuck wrench, wherein the safety device comprises an alarm, a power source and an alarm activation switch. The alarm activation switch causes the alarm to activate so long as the chuck wrench is engaged in a chuck, subject to de-activation by engagement of a cut-off switch, if any.

Figure 1:
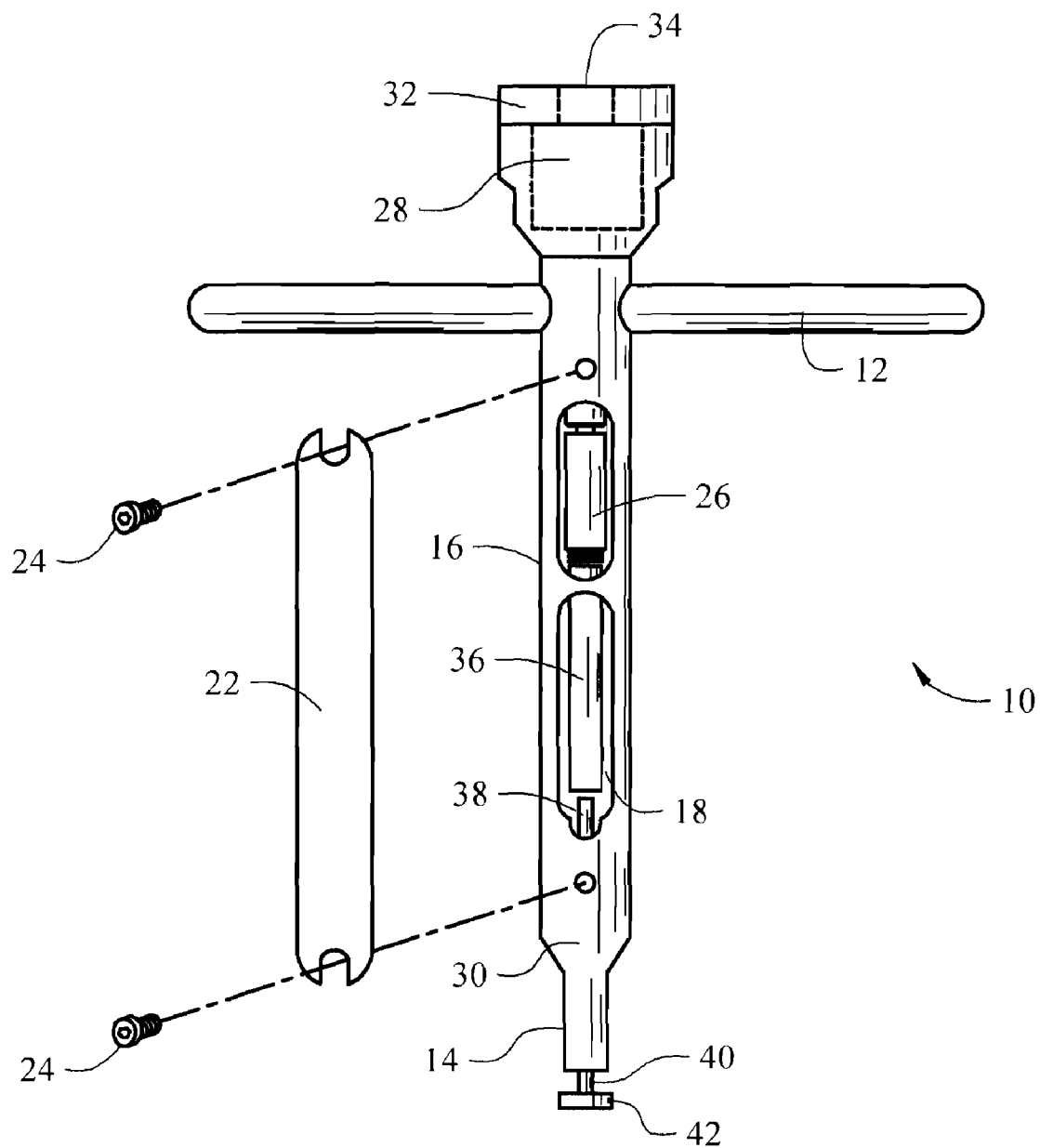
FIG. 1 is a partially disassembled side view of an embodiment of the present invention, where no mechanism for temporarily disabling the safety device is present.

Turning now to the drawings, in one embodiment, as illustrated in FIG. 1, a chuck wrench 10 comprises a handle 12, a bit 14 and a shaft 16 extending from the bit 14 to the handle 12. Preferably, the bit 14 is located at one end of the shaft 16 and the shaft 16 extends axially from the bit 14 to the handle 12 and the handle 12 extends generally perpendicularly relative to the shaft 16. Of course, the shaft 16 may extend beyond the handle 12, particularly if such extension assists in manufacture of the wrench or strength of attachment of the handle to the wrench.

As further illustrated in FIG. 1, the shaft 16 may contain a cavity 18. The cavity 18 is sufficiently large to accommodate at least a portion of the safety device described below. Alternative embodiments, however, will be discussed below wherein the safety device instead may be located within a cavity in the handle 12, part of the safety device may be located in the handle 12 and part in the shaft 16, or part of the safety device may be located in handle 12, the shaft 16 or both and part may be located elsewhere, so long as the part located elsewhere is in operative communication with the part in the wrench 10 as further explained below.

While the cavity in the shaft 16 or the handle 12, or each cavity in both the shaft 16 and the handle 12, if both contain cavities, is sufficiently large to contain the safety device or the portion thereof located in that cavity, it is not so large as to weaken the wrench to the point that the wrench 10 is liable to break or to deform under ordinary use. Preferably, each cavity is accessible for repair or replacement of parts of the safety device or portion of the safety device located in the cavity, with the access being selectively closable, such as with a cover 22, which can optionally be held in place by screws 24.

As noted, the safety device comprises an alarm 28, a power source 26 and an alarm activation switch 36 that causes the alarm to activate so long as the chuck wrench 10 is engaged in a chuck, subject to de-activation by engagement of a cut-off switch 20, if any. FIG. 1 shows an embodiment where the alarm 28 and the power source 26 located in the cavity 18, and where the power source is located between the bit 14 and handle 12, and where the cavity 18 extends past the handle 12 to an alarm 28 adjacent the end of the shaft 16 away from the bit 14. In this embodiment, at the end of the shaft 16 away from the bit is a cap 32 removably secured to that end of the shaft 16 such as by screwing the cap 32 onto the shaft 16. The cap 32 may include one or more openings 34 to allow passage therethrough of the signal from the alarm 24.

At the opposite end of the shaft 16, an alarm activation switch 36 provides a mechanism by which engagement of the bit 14 with a chuck activates the alarm 24, subject to de-activation by engagement of a cut-off switch 20, if present. The alarm activation switch 36 may operate by any of several means. For example, the alarm activation switch 36 as shown in the figures is a plunger 30 biased outwardly of the bit 14 such that the weight of the chuck wrench 10, when engaged or resting in a chuck, pushes in the plunger, thereby activating the alarm (subject to de-activation by engagement of a cut-off switch, if present). In an alternative embodiment, the alarm activation switch 36 may extend radially from the bit 14, with no plunger present, and be activated directly by insertion of the bit into the chuck and compression of the alarm activation switch radially inwardly by contact with the side wall of the chuck. In an alternative embodiment, the alarm activation switch 36 may be of the type that no actual pressure is required to activate it, but instead physical contact alone between the chuck and the alarmed chuck wrench may activate it. For example, the switch 36 may be on a surface of the bit 14 that contacts the chuck when the bit is engaged therein such that the mere physical contact of the switch with the chuck or compression of the switch resulting from insertion of the bit 14 into the chuck is sufficient to activate the switch. Such switches and others that would be suitable for the purposes of this invention are well known and would be readily apparent to those of ordinary skill in the art upon reading the subject disclosure.

An embodiment of the specific spatial relationship between the alarm activation switch 36 and the remainder of the chuck wrench 10, as well as the various components of the safety device, can be seen in the non-limiting exemplary embodiments detailed in the figures.

The power source 26 provides power to the alarm 28 when the alarm activation switch 36 has been activated. The power source 26 may be of any suitable type known by those of ordinary skill in the art. In an embodiment, where the chuck wrench shaft 16 comprises a cavity 18, and where one or more components of the safety device reside therein, the power source 26 is a battery and is housed entirely within the cavity 18.

As noted above safety device is associated with the chuck wrench 10, by which it is meant that each or all of the components may be physically attached to the chuck wrench, housed within the chuck wrench or located at some distance from the chuck wrench so long as they are in operative communication with the activation switch, which causes the alarm to activate (subject to deactivation it a cut-off switch is also present) so long as the wrench is engaged in a chuck. In one embodiment, the power source 26, alarm 28 and alarm activation switch 36 are each at least partially housed within the chuck wrench 10. In another embodiment, the activation switch 36 is physically attached to the chuck wrench 10, and may further be at least partially housed within the chuck wrench, and the alarm is located at some distance from the chuck wrench. In this embodiment, it is preferred that a signal of some type be sent from the safety-equipped chuck wrench to the alarm 28 upon activation of the alarm activation switch 36.

One embodiment of the present invention includes a mechanism for temporarily disabling the alarm 28. When an operator is using the chuck wrench 10, it may be undesirable for that operator to be using the chuck wrench or otherwise be literally within an arm's reach of a chuck wrench while the alarm is activated. Thus, in one embodiment of the present invention, the safety-equipped chuck wrench further comprises a mechanism for temporarily disabling the alarm, where the mechanism is preferably a cutoff switch 20.

The cutoff switch 20 of the present invention is preferably located on the handle 12 of the chuck wrench 10, in such a position that an operator can apply pressure to the switch 20 merely by grasping the handle 12. In an embodiment of the present invention, one cutoff switch 20 is present on the handle 12, and in another embodiment two cutoff switches are present on the handle, with one being present on the handle 12 on either side of the shaft 16.

Figure 3A:
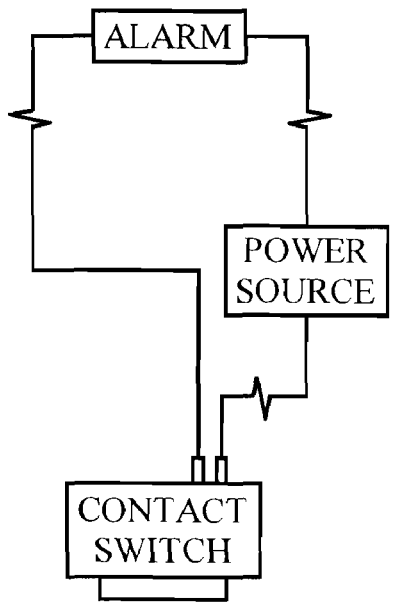
FIG. 3A is an electrical diagram of an embodiment of the present invention, where no mechanism for temporarily disabling the safety device is present.

In the embodiment show in FIG. 1, the chuck wrench 10 further comprises a plunger pin 30, where the plunger pin extends from within the shaft 16 of the chuck wrench 10 and out through and at least partially beyond the end of the bit 14, oriented parallel to the shaft 16, and preferably oriented such that the longitudinal axis of the plunger pin 30 is substantially aligned with the longitudinal axis of the shaft 16. The plunger pin 30 has an internal end 38 and an external end 40, the external end optionally further comprising a disk 42, and the internal end being oriented generally in the direction of the alarm activation switch 36. The alarm activation switch 36 preferably resides entirely within a cavity 18 within the shaft 16. The power source 26, preferably a battery, resides entirely within a cavity 18 within the shaft 16, and is preferably on the opposite side of the alarm activation switch 36 from the plunger 30, so as not to interfere with the plunger 30 and alarm activation switch 36 interaction when the chuck wrench 10 is in operation. The alarm 28 is at the top of the shaft 16, preferably at least partially within a cavity 18 within the shaft. In this embodiment, the alarm activation switch 36, the power source 26, and the alarm 28 are all wired together in a single loop circuit, an embodiment of which is detailed in FIG. 3A.

In another embodiment, no plunger pin is present, and in such an embodiment the alarm activation switch 36 preferably extends from within the shaft 16 of the chuck wrench 10 and out through and at least partially beyond the end of the bit 14, oriented parallel to the shaft 16, and preferably oriented such that the longitudinal axis of the alarm activation switch 36 is substantially aligned with the longitudinal axis of the shaft 16. In yet another embodiment, where no plunger pin is present, the alarm activation switch 36 may extend from within the shaft 16 of the chuck wrench 10 and out through and at least partially beyond the end of the shaft 16, and further may form a bit 14, where the bit 14 is oriented parallel to the shaft 16, and preferably oriented such that the longitudinal axis of the bit 14 is substantially aligned with the longitudinal axis of the shaft 16.

Figure 2:
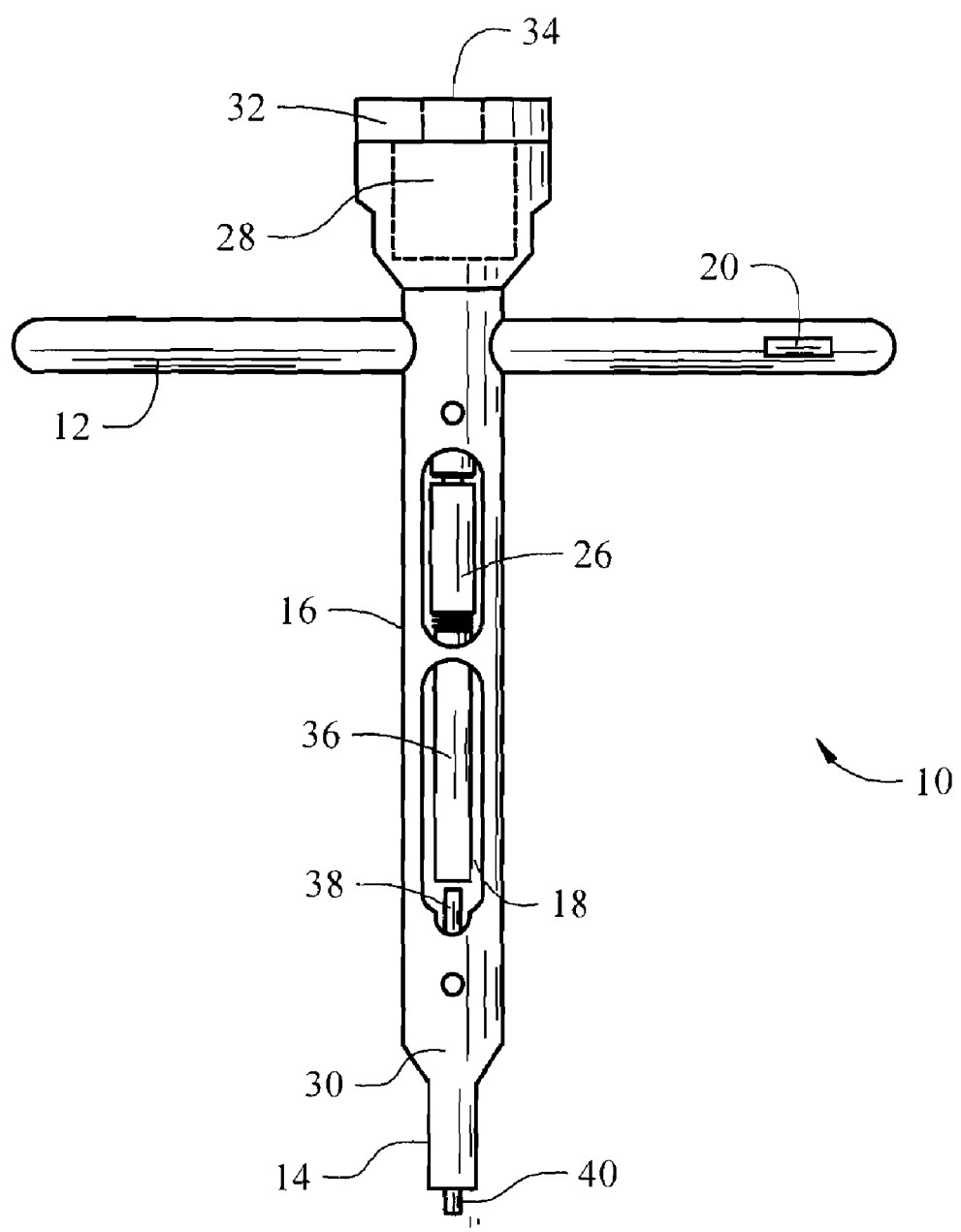
FIG. 2 is a partially disassembled side view of an embodiment of the present invention, including a mechanism for temporarily disabling the safety device.
Figure 3B:
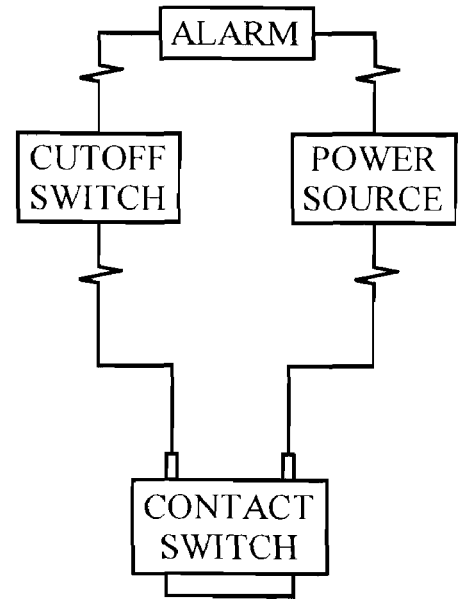
FIG. 3B is an electrical diagram of an embodiment of the present invention, where a mechanism for temporarily disabling the safety device is present in the form of a single cutoff switch.

Turning now to FIG. 2, which details the particularly preferred embodiment of FIG. 1 with the addition of a mechanism for temporarily disabling the safety device in the form of a single cutoff switch 20. In this embodiment, the cutoff switch 20, the alarm activation switch 36, the power source 26, and the alarm 28 are all wired together in a single loop circuit, an embodiment of which is detailed in FIG. 3B. As seen in FIG. 2, it is preferred that the cutoff switch 20, when present, be located on a handle 12 of the chuck wrench 10. Further, FIG. 2 demonstrates an embodiment where the external end of the plunger pin 40 does not include a disk.

The cutoff switch may be a trigger type switch, which one of ordinary skill in the art would recognize is the type of switch that, when pressure is applied thereto, the safety device is deactivated, but when pressure is removed therefrom, the safety device is reactivated. A trigger type cutoff switch that would permit the safety device to remain deactivated even after pressure is removed therefrom is somewhat less desirable, though it is an embodiment of the present invention, because the operator may deactivate the safety device and walk away from a chuck wrench that remains in the chuck, which eliminates the efficacy of the safety device.

In another embodiment the cutoff switch is a sensor type switch, which comprises at least one sensor that detects the hand of the operator on the handle of the chuck wrench. Such a sensor would preferably function by detecting the presence of the operator's hand on the handle, whereupon the alarm is deactivated, but when the hand is removed therefrom, the safety device is reactivated. In an embodiment, where the cutoff switch is a sensor type switch, no actual pressure is required from the hand of the operator for the cutoff switch to deactivate the alarm.

Figure 3C:
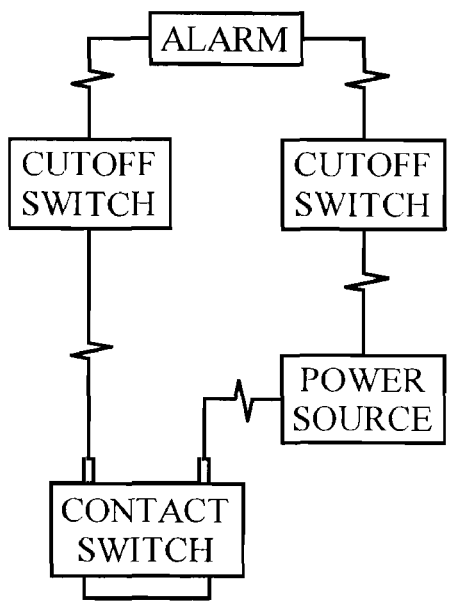
FIG. 3C is an electrical diagram of an embodiment of the present invention, where a mechanism for temporarily disabling the safety device is present in the form of two cutoff switches.

One skilled in the art, from the foregoing, can easily discern that a second cutoff switch 20 can be located on the end of handle 12 opposite that of the first cutoff switch 20 seen in FIG. 2, and in that particular embodiment, the cutoff switches 20, the alarm activation switch 36, the power source 26, and the alarm 28 are all wired together in preferably a single loop circuit, an embodiment of which is detailed in FIG. 3C.

The safety-equipped chuck wrench of the present invention preferably operates thusly, when a plunger pin 30 is present: When an unattended chuck wrench 10 is resting in a chuck, oriented such that the end of the chuck wrench with the bit 14 is oriented below the horizontal, the weight of the chuck wrench 10 will force it downward thereby depressing the plunger pin 30 deeper into the chuck wrench and into contact with the alarm activation switch 36 such that the alarm activation switch closes the loop circuit, resulting in the power source 26 activating the alarm 28.

When no plunger pin is present, the safety-equipped chuck wrench of the present invention preferably operates thusly: When an unattended chuck wrench 10 is resting in a chuck, oriented such that the end of the chuck wrench with the bit 14 is oriented below the horizontal, the weight of the chuck wrench 10 will force it downward thereby depressing the alarm activation switch 36 such that the alarm activation switch closes the loop circuit, resulting in the power source 26 activating the alarm 28.

In another embodiment of the present invention, the chuck wrench 10 further comprises a sheath 44 and a spring 46, where the spring coil at least partially encompasses the shaft 16 of the chuck wrench 10 below the handle 12, and where the sheath 44 substantially encompasses both the shaft 16 of the chuck wrench 10 below the handle 12 and the spring 46. In this embodiment, the spring 46, when at rest, holds the sheath 44 over and beyond the end of the bit 14, and, when compresses, permits the sheath 44 to retract away from the bit 14 longitudinally up the shaft 16 of the chuck wrench 10 towards the handle 12. In this embodiment, the spring 46 and sheath 44 serve as an additional safety feature, and this embodiment can be seen more fully in FIG. 4.

Figure 4:
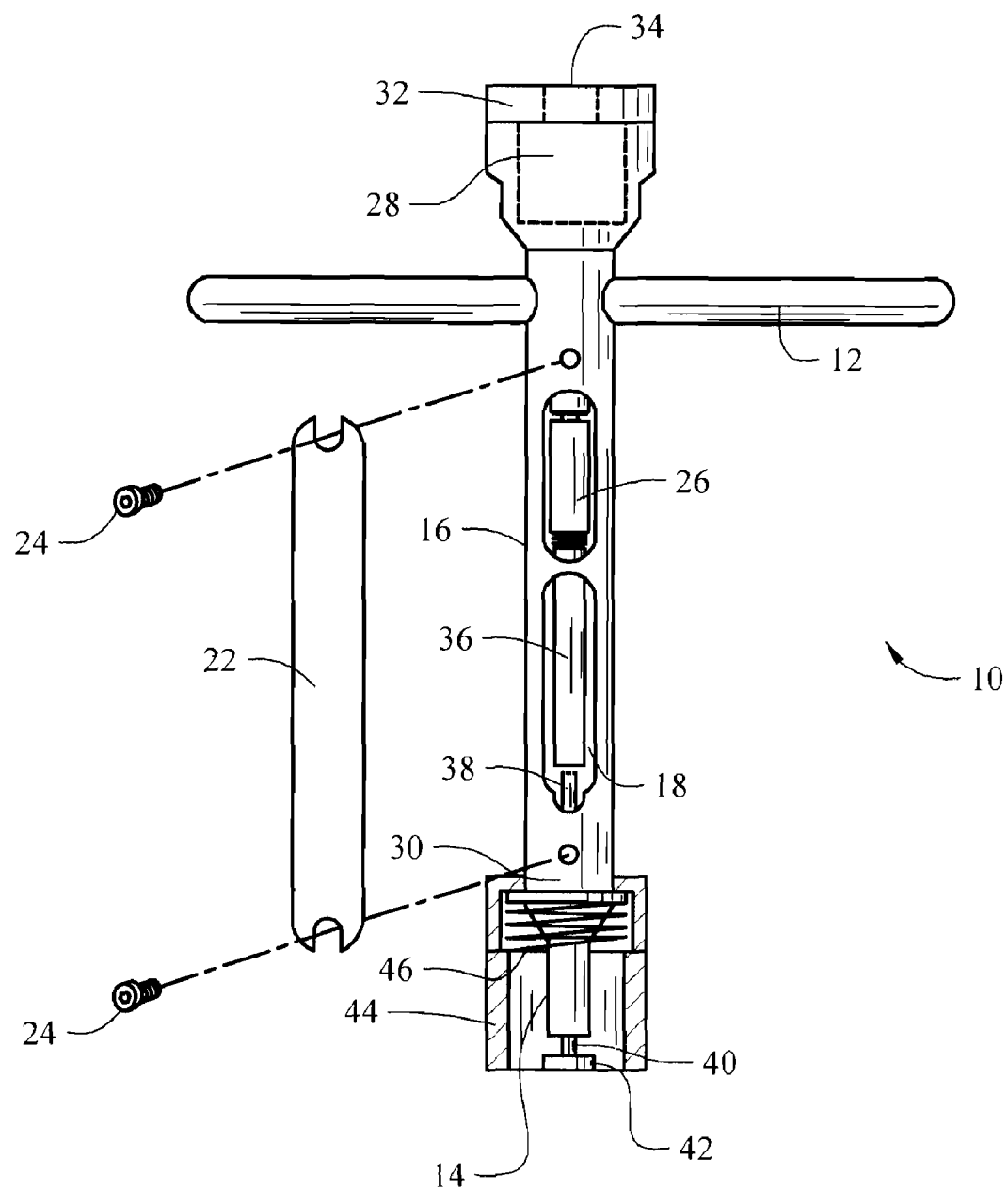
FIG. 4 is a cut-away perspective view of an embodiment of the present invention, wherein the alarmed chuck wrench further comprises a spring and a sheath.

The embodiment of the chuck wrench 10 of the present invention as detailed in FIG. 4 preferably operates thusly: When an unattended chuck wrench 10 is resting in a chuck, oriented such that the end of the chuck wrench with the bit 14 is oriented below the horizontal, the weight of the chuck wrench 10 will force it downward thereby depressing the alarm activation switch 36, whether through the use of a plunger pin 30 or not, whereby the alarm activation switch closes the loop circuit, resulting in the power source 26 activating the alarm 28. This particular chuck wrench 10 additionally includes a spring 46 and sheath 44 to create a self-ejecting mechanism as a secondary safety device in the event the power source 26 is depleted or the primary audible and/or visual alarm malfunctions. In this embodiment, the spring 46 forces the sheath 44 down the shaft 16 away from the handle 12 and towards and past the bit 14, thereby pushing the chuck wrench 10 away from the machine tool chuck, such that, when the operator has completed using the chuck wrench, in the event the operator leaves the chuck wrench in the machine tool, the force of the spring 46 would push the chuck wrench out of the chuck.

Where the alarm comprises an audible alarm, preferably the audible alarm is of sufficient volume or decibel level so as to be audible by the operator and those nearby over the ambient noises associated with one or more machine tools or a typical factory floor, but is not so loud or at such a high decibel level as to cause ear damage to the operator or those nearby. It is especially preferable that the alarm be so loud as to be uncomfortable or irritating to the operator and those nearby so as to hold their attention so that they are unlikely to ignore or to forget that the chuck wrench alarm remains activated but not so loud as to cause pain. In a preferred embodiment, the decibel level of the audible alarm is about ninety-five (95) decibels.

One of ordinary skill in the art would understand that an audible alarm comprises at least three adjustable qualities, those being the loudness, timbre and pitch. The loudness, or volume, of the alarm may be measured in decibels. The timbre of the alarm, which refers to the type of sound the alarm emits, may be of any suitable type, such as a buzz, a beep, or any other sound known by those of ordinary skill in the art. The pitch of the alarm refers to the frequency of the sound wave of the alarm.

Where the alarm comprises an audible alarm, the audible alarm may operate at a consistent pitch or may alternate pitch, and the audible alarm may operate at a consistent tone or may alternate tones. The audible alarm, when present, may operate in a pulsating manner, which one of ordinary skill in the art would recognize as intermittent alternating periods of audible sound and no audible sound, or intermittent alternating periods of audible sound of one loudness, timbre and pitch, and a distinct loudness, timbre and pitch.

Where the alarm comprises a visual alarm, preferably the visual alarm is in the form of a light source, where the light source is of sufficient strength so as to be visual by the operator and those nearby. The light source may be a steady light, or a pulsating light, or any other suitable type of light source. The light source may also be a siren-type light, which one skilled in the art would recognize as one or more mirrors that rotate around at least one light. The light source may also be a plurality of lights, and where a plurality of lights is present, the lights may be of various colors, and further may pulsate in sequence. A visual alarm is particularly beneficial for an operator with at least partial hearing loss, or who is wearing noise-cancelling earmuffs, or in a particularly loud work environment, or any other environment where an audible alarm is not preferred.

In an embodiment, both an audible alarm and a visual alarm are present, thereby adding to the safety of the chuck wrench of the present invention.

One of ordinary skill in the art would recognize that where the term "activate" or any variant thereof is used herein, the term refers to the closure of the circuit within the chuck wrench, wherein the closure of the circuit results in power reaching the alarm. Similarly, where the term "deactivate" or any variant there of is used here, the term refers to the opening of the circuit within the chuck wrench, wherein the opening of the circuit results in power not reaching the alarm. Further, where the term "power" is used herein, the term refers to energy from a power source, such as a battery, within the chuck wrench.

As used herein, the term "associated" and tenses thereof, when referring to the safety device being associated with the chuck wrench, indicates a physical and functional relationship between the two, such that at least the activation switch of the safety device is physically attached to the chuck wrench, and such that the activation switch is in operative communication with the remainder of the safety device.

As used herein, the term "attached" embraces both removable and permanent attachment.

The chuck wrench of the present invention may be suitable with any type of chuck bit, including but not limited to square or hexagonal chuck bits.

The chuck wrench of the present invention may further comprise an access panel, as well as one or more securing devices, such as screws, to permit ready access to the internal components of the chuck wrench, which may, for example, be useful in changing the power source upon depletion, or for making repairs to the alarm activation switch, internal wiring or the like.

When the power source of the present invention is a battery, any suitable voltage is appropriate, though a voltage of about 3V to about 24 V is preferred, and a voltage of about 12V is more preferred. In an embodiment, the battery is a rechargeable battery. In an embodiment of the present invention, the chuck wrench further comprises a mechanism by which the battery contained therein can be recharged, such as a power cable input port, or any other suitable mechanism known by those of ordinary skill in the art.

The present invention is also directed to a method of operating a safety-equipped chuck wrench. In this method, the operator of the safety-equipped chuck wrench will engage the bit of the safety-equipped chuck wrench of the present invention in a chuck, and then apply torque force on the handle of the safety-equipped chuck wrench, which will result in the tightening or loosening of the chuck. Subsequently, the operator will release the handle of the safety-equipped chuck wrench and leave the safety-equipped chuck wrench in the chuck, which will activate the alarm. The operator will then become aware that the safety-equipped chuck wrench remains in the chuck through sensory observation of the alarm associated with the safety-equipped chuck wrench. Finally, the operator will then remove of the safety-equipped chuck wrench from the chuck. Optionally, where the safety-equipped chuck wrench comprises a cutoff switch, while applying torque force on the handle of the safety-equipped chuck wrench, the operator will simultaneously engage a cutoff switch, where the cutoff switch prevents activation of the alarm as long as it is engaged.

It should be understood that the aforementioned embodiments are for exemplary purposes only and are merely illustrative of the many possible specific embodiments that can represent applications of the principles of the invention.

Without departing from the spirit and scope of this invention, one of ordinary skill in the art can make various changes and modifications to the invention to adapt it to various usages and conditions, including those not specifically laid out herein. As such, those changes and modifications are properly, equitably, and intended to be, within the full range and scope of equivalents of the invention disclosed and described herein.

I claim:

1. A safety-equipped chuck wrench, comprising a chuck wrench having a bit for engagement with a chuck, a safety device associated with the chuck wrench, the safety device comprising an alarm, a power source and an alarm activation switch on or in the bit that causes the alarm to activate, subject to de-activation by engagement of a cut-off switch if any, so long as the chuck wrench is engaged in a chuck and to de-activate when the chuck wrench is dis-engaged from the chuck.

2. A safety-equipped chuck wrench as set forth in claim 1 wherein the alarm is an audible alarm; a visual alarm; or a combination of an audible alarm and a visual alarm.

3. A safety-equipped chuck wrench as set forth in claim 1 wherein the device further comprises a cut-off switch that, upon engagement thereof, de-activates the alarm.

4. A safety-equipped chuck wrench as set forth in claim 3 wherein the chuck wrench further comprises a handle for turning the wrench and the cut-off switch is configured such that contact between an operator of the chuck wrench and the handle engages the cut-off switch and upon cessation of such contact, the cut-off switch is disengaged, thereby activating the alarm.

5. A safety-equipped chuck wrench as set forth in claim 4 wherein the contact that engages the cut-off switch is a gripping of the handle by the operator.

6. A safety-equipped chuck wrench as set forth in claim 4 wherein the contact that engages the cut-off switch is a gripping of the handle such as to turn the safety-equipped chuck wrench.

7. A safety-equipped chuck wrench as set forth in claim 1 wherein the chuck wrench comprises a shaft extending axially from the bit engageable with a chuck, and wherein the alarm and the power source are each at least partially located within the shaft.

8. A safety-equipped chuck wrench as set forth in claim 7 wherein a cavity extends axially within the shaft and the alarm and the power source are each at least partially located within the cavity.

9. A safety-equipped chuck wrench as set forth in claim 1 wherein the bit has an exterior and the chuck has a complementary interior and the bit engages with the chuck by insertion of the bit into the interior void of the chuck and the alarm activation switch is activated by depression of the switch into the bit as the bit is inserted into the interior void of the chuck.

10. A safety-equipped chuck wrench as set forth in claim 9 wherein the interior void of the chuck is defined by a multi-faced interior chuck surface and the switch is depressed into the bit by at least one of the faces as the bit is inserted into the chuck.

11. A safety-equipped chuck wrench as set forth in claim 1 wherein the switch activates and the alarm by closing an electrical circuit between the power supply and the alarm, the activation resulting from electromechanical communication within the shaft between the switch and the circuit.

12. A safety-equipped chuck wrench, comprising a chuck wrench, a safety device associated with the chuck wrench, the safety device comprising an alarm, a power source, an alarm activation switch that causes the alarm to activate, subject to de-activation by engagement of a cut-off switch if any, so long as the chuck wrench is engaged in a chuck and to de-activate when the chuck wrench is dis-engaged from the chuck, and a cavity that extends axially within the shaft, each of the alarm and the power source being at least partially located within the cavity, wherein a passageway extends from the cavity through the bit and the alarm activation switch includes a rod that extends from the passageway outwardly from the bit and is biased outwardly such that when the bit is placed in a chuck, the rod is pushed inwardly, activating the alarm subject to engagement of the cut-off switch, and when the bit is removed from the chuck, the rod moves outwardly, deactivating the alarm.

13. A safety-equipped chuck wrench as set forth in claim 12 wherein the weight of the safety-equipped chuck wrench is sufficient to activate the alarm subject to engagement of the cut-off switch.

14. A safety-equipped chuck wrench comprising a chuck wrench and a safety device, where the chuck wrench comprises a shaft extending from a bit at a base of the shaft to a handle, wherein the shaft further comprises a cavity, and wherein the safety device comprises an alarm, a power source, an alarm activation switch, and wiring, where the alarm is selected from the group consisting of an audible alarm; a visual alarm; and both an audible alarm and a visual alarm, and wherein the wiring and the power source reside entirely within the cavity, and wherein the power source, the alarm and the alarm activation switch are connected in a single loop circuit by way of the wiring, and wherein the alarm activation switch is located at the bit at the base of the shaft and extends at least partially within the cavity.

15. A safety-equipped chuck wrench as set forth in claim 14, wherein the alarm is an audible alarm, and where in the audible alarm, when activated, is at a consistent pitch, timbre and loudness.

16. A safety-equipped chuck wrench as set forth in claim 14, wherein the alarm is an audible alarm, and where in the audible alarm, when activated, alternates between at least two values of pitch.

17. A safety-equipped chuck wrench as set forth in claim 14, wherein the alarm is an audible alarm, and where in the audible alarm, when activated, alternates between at least two values of timbre.

18. A safety-equipped chuck wrench as set forth in claim 14, wherein the alarm is an audible alarm, and where in the audible alarm, when activated, alternates between at least two values of loudness.

19. A safety-equipped chuck wrench as set forth in claim 14, wherein the alarm is a visual alarm.

20. A safety-equipped chuck wrench as set forth in claim 14, further comprising a sheath and a spring, where the spring coil at least partially encompasses the shaft of the chuck wrench below the handle, and where the sheath substantially encompasses both the shaft of the chuck wrench below the handle and the spring.

21. A safety-equipped chuck wrench as set forth in claim 14, further comprising at least one cutoff switch.

22. A safety-equipped chuck wrench as set forth in claim 21, wherein the at least one cutoff switch is selected from the group consisting of a trigger type switch and a sensor type switch.

23. A safety-equipped chuck wrench as set forth in claim 22, where the at least one cutoff switch is located on at least one handle of the chuck wrench.

24. A method of operating a safety-equipped chuck wrench, the safety-equipped chuck wrench comprising a chuck wrench having a bit for engagement with a chuck, a safety device associated with the chuck wrench, the safety device comprising an alarm, a power source and an alarm activation switch on or in the bit that causes the alarm to activate, subject to de-activation by engagement of a cut-off switch if any, so long as the chuck wrench is engaged in a chuck and to de-activate when the chuck wrench is dis-engaged from the chuck; the method comprising:
   (a) engaging the bit of the safety-equipped chuck wrench in a chuck;
   (b) applying torque force to the handle of the safety-equipped chuck wrench, resulting in tightening or loosening the chuck; and
   (c) releasing the handle of the safety-equipped chuck wrench while leaving the bit engaged in the chuck, resulting in activation of the alarm.

25. The method of operating a safety-equipped chuck wrench of claim 24 wherein the safety-equipped chuck wrench further comprises a cutoff switch, the cutoff switch is engaged while the torque force is applied to the handle of the safety-equipped chuck wrench and the cutoff switch is dis-engaged upon release of the handle, thereby activating the alarm.

* * * * *